(12) United States Patent
Mettler et al.

(10) Patent No.: US 7,681,857 B2
(45) Date of Patent: Mar. 23, 2010

(54) PORTABLE SIGN AND BARRICADE ASSEMBLIES AND PLASTIC MOLDED UPRIGHTS AND LIGHT AND FLAG MOUNTS THEREFOR

(75) Inventors: Charles M. Mettler, Perry, OH (US); Gregory H. Brown, Stow, OH (US)

(73) Assignee: Plastic Safety Systems, Inc., Cleveland, OH (US)

( * ) Notice: Subject to any disclaimer, the term of this patent is extended or adjusted under 35 U.S.C. 154(b) by 0 days.

(21) Appl. No.: 11/854,729

(22) Filed: Sep. 13, 2007

(65) Prior Publication Data

US 2008/0001046 A1    Jan. 3, 2008

Related U.S. Application Data

(60) Division of application No. 11/097,780, filed on Apr. 1, 2005, now Pat. No. 7,523,715, which is a continuation-in-part of application No. 10/737,019, filed on Dec. 16, 2003, now Pat. No. 7,111,815, and a continuation-in-part of application No. 11/031,408, filed on Jan. 7, 2005, now Pat. No. 7,536,973.

(51) Int. Cl.
   *F16M 13/00* (2006.01)
(52) U.S. Cl. .................................................. 248/523
(58) Field of Classification Search ................ 248/523, 248/519, 218.4, 346.01
   See application file for complete search history.

(56) References Cited

U.S. PATENT DOCUMENTS

| | | | |
|---|---|---|---|
| 813,001 A | 2/1906 | Holt | |
| 1,223,487 A * | 4/1917 | Gohl | 248/512 |
| 1,383,234 A * | 6/1921 | Raguse | 116/173 |
| 1,435,785 A | 11/1922 | Alexander | |
| 1,788,157 A * | 1/1931 | Hogan | 248/541 |
| 2,278,287 A * | 3/1942 | Ryan | 116/173 |
| 3,380,428 A | 4/1968 | Abrams | |
| 4,269,534 A | 5/1981 | Ryan | |
| 4,275,535 A | 6/1981 | Stalzer | |
| 4,596,489 A | 6/1986 | Mariol et al. | |
| 4,792,258 A | 12/1988 | Goff | |
| 5,186,438 A | 2/1993 | Cross et al. | |
| 5,451,118 A | 9/1995 | Wilkins et al. | |
| 5,484,225 A | 1/1996 | Warner | |
| 5,560,732 A | 10/1996 | Kulp et al. | |
| 5,581,868 A * | 12/1996 | Bisch | 29/525.08 |
| 5,702,090 A | 12/1997 | Edgman | |

(Continued)

OTHER PUBLICATIONS

PST-III Assembly & Parts list, copyright 1999.

(Continued)

*Primary Examiner*—Amy J Sterling
(74) *Attorney, Agent, or Firm*—Renner, Otto, Boisselle & Sklar, LLP

(57) ABSTRACT

Plastic molded uprights and/or light and flag mounts may include stepped upper ends for mounting of a light thereon and/or laterally spaced apart oppositely downwardly angled flag mounting holes extending at least partway therethrough adjacent the upper ends thereof. One or more pairs of integral molded, axially spaced apart flanges may protrude outwardly from one of the front and back walls of the uprights for aiding in locating and supporting one or more barricade boards between respective pairs of flanges.

8 Claims, 9 Drawing Sheets

U.S. PATENT DOCUMENTS

| | | | |
|---|---|---|---|
| 5,722,788 A | 3/1998 | Bent et al. | |
| 5,860,386 A | 1/1999 | Schwab et al. | |
| 6,019,542 A | 2/2000 | Bent et al. | |
| 6,047,941 A * | 4/2000 | Kulp et al. | 248/536 |
| 6,182,600 B1 | 2/2001 | Brown et al. | |
| 6,305,312 B1 | 10/2001 | Bent et al. | |
| 6,520,712 B2 | 2/2003 | Kulp et al. | |
| 6,536,369 B1 | 3/2003 | Bent et al. | |
| 6,659,681 B1 | 12/2003 | Kulp et al. | |
| 6,742,748 B1 | 6/2004 | Gretz | |
| 7,036,798 B1 | 5/2006 | Olson | |
| 7,040,590 B2 * | 5/2006 | Carnevali | 248/311.2 |
| 7,111,815 B2 * | 9/2006 | Mettler et al. | 248/519 |
| 2004/0169118 A1 * | 9/2004 | Talaucher et al. | 248/314 |

OTHER PUBLICATIONS

Type III Barricade brochure (2 pages) dated Dec. 20, 2000.
Rad-Tec Rubber Products brochure (5 pages) dated Dec. 13, 2002.

* cited by examiner

PORTABLE SIGN AND BARRICADE ASSEMBLIES AND PLASTIC MOLDED UPRIGHTS AND LIGHT AND FLAG MOUNTS THEREFOR

CROSS-REFERENCE TO RELATED APPLICATIONS

This application is a division of U.S. patent application Ser. No. 11/097,780, filed Apr. 1, 2005, which is a continuation-in-part of U.S. patent application Ser. No. 10/737,019, filed Dec. 16, 2003, now U.S. Pat. No. 7,111,815, dated Sep. 26, 2006, and a continuation-in-part of U.S. patent application Ser. No. 11/031,408, filed Jan. 7, 2005.

FIELD OF THE INVENTION

This invention relates to plastic molded uprights for use in supporting barricade boards and signs or other structures in a generally upright position. Also this invention relates to plastic molded light and flag mounts for supporting lights and/or flags on top of uprights of different types.

SUMMARY OF THE INVENTION

Heretofore square hollow metal or plastic tubing was commonly used as the uprights in portable barricade and sign assemblies to support barricade boards or signs and the like. Typically the uprights were maintained in a generally upright position by attaching the lower ends of the uprights to conventional base supports. The boards or signs were typically secured to the uprights by inserting fasteners through aligned holes in the boards or signs and uprights.

One problem with such previous assemblies was the amount of time that it usually took to set the assemblies up and/or take them down. Also there was no convenient way of easily and quickly attaching a light and/or flag to the uprights as may be desired or required in certain applications.

SUMMARY OF THE INVENTION

In accordance with one aspect of the invention, a hollow plastic molded upright may be provided with one or more axially spaced pairs of integrally molded flanges protruding outwardly from one of the front and back walls thereof for aiding in locating and supporting barricade boards between each pair of flanges.

In accordance with another aspect of the invention, one or more mounting holes may extend through the front and back walls of the uprights between the pairs of flanges and through barricade boards and/or signage for receipt of fasteners for attaching the barricade boards and/or signage to the uprights.

In accordance with another aspect of the invention, the mounting holes may have solid walls extending completely through the uprights and barricade boards for ease of inserting fasteners through the mounting holes.

In accordance with another aspect of the invention, one end of the mounting holes in the uprights may have an enlarged cylindrical recess for rotatably receiving a fastener bolt head.

In accordance with another aspect of the invention, the other end of the mounting holes in the uprights may have an enlarged non-cylindrical shaped recess for flush, non-rotatable mounting of a correspondingly shaped fastener nut or bolt head.

In accordance with another aspect of the invention, the ends of the mounting holes in the board-like members may have enlarged non-cylindrical shaped recesses for flush mounting of a correspondingly shaped nut in either end.

In accordance with another aspect of the invention, the wall of the uprights opposite the flanged wall may be planar to enable signage to be easily attached up against the planar wall.

In accordance with another aspect of the invention, a light mount and/or flag mount may be provided on the upper end of the uprights.

In accordance with another aspect of the invention, the light mount and/or flag mount may be integral with the upper end of the uprights or removably attachable thereto.

In accordance with another aspect of the invention, the base supports that are used to support the uprights in a generally upright position may have a non-cylindrical shaped mounting hole extending completely through the base supports for close sliding receipt of a correspondingly shaped lower end portion of the uprights. Also, a plurality of laterally spaced longitudinally extending ribs may be provided around the entire periphery of the mounting hole that are transversely rounded for establishing line contact with the lower end portion of the uprights when inserted into the mounting hole.

In accordance with another aspect of the invention, the base supports may have a wider intermediate portion than opposite end portions, and the mounting hole may extend through the intermediate portion and have a width that is greater than the width of the end portions.

In accordance with another aspect of the invention, the barricade boards may be blow-molded to include a relatively high strength reinforced core that permits the wall thickness of the boards to be made less than conventional extruded boards and still have substantially the same relative strength and stiffness as conventional extruded boards.

In accordance with another aspect of the invention, the cores of the blow-molded barricade boards may be formed by molding a plurality of longitudinally extending, laterally spaced, aligned channels or grooves in oppositely facing sides of the boards and joining the inner walls of the aligned channels/grooves together during the blow molding process. Also the channels or grooves may be wavy along their length for increased strength.

These and other objects, advantages, features and aspects of the present invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE INVENTION

Figure 1:
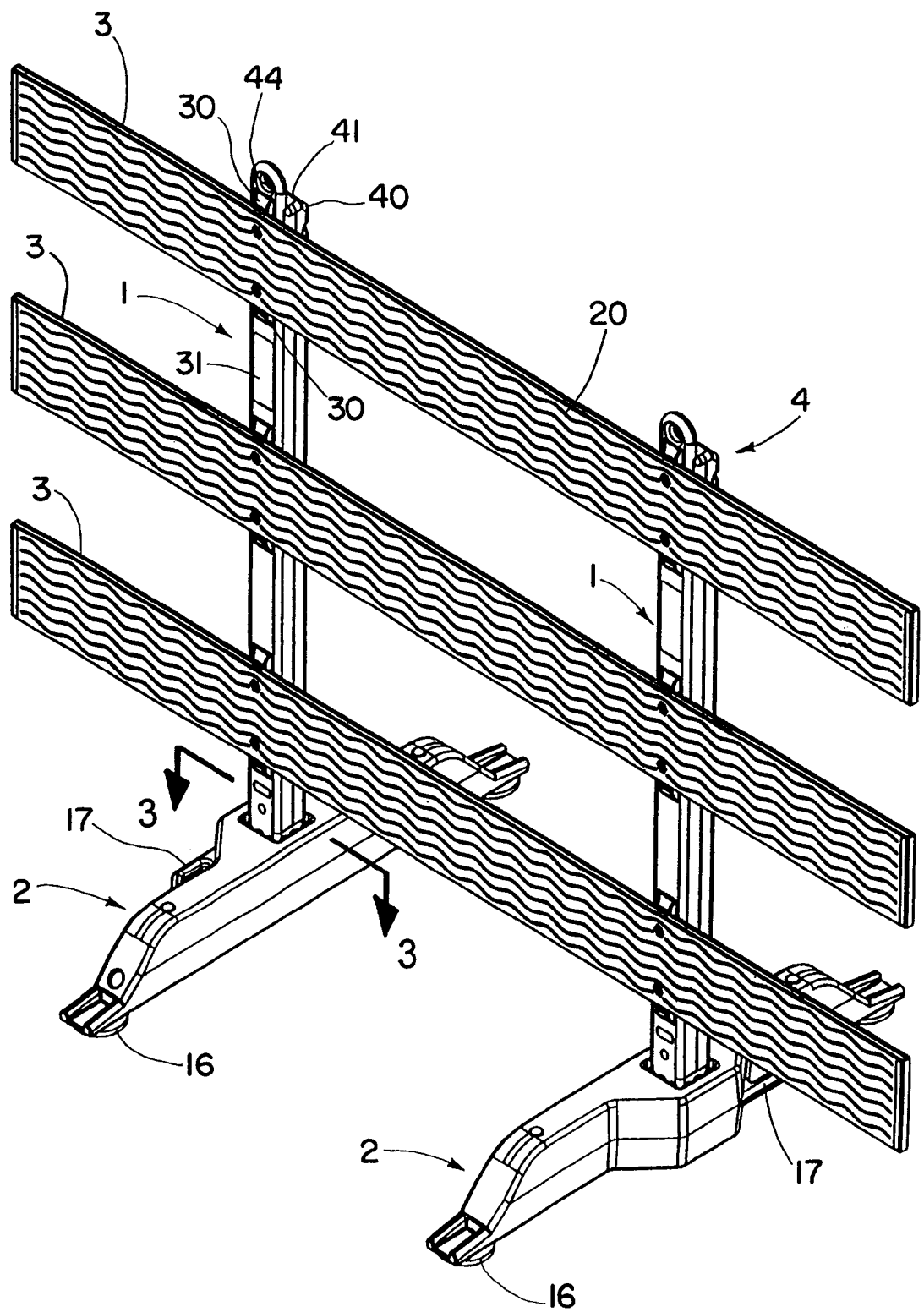
FIG. 1 is a perspective view of one form of upright and base support assembly of the present invention shown being used to support a plurality of barricade boards.
Figure 2:
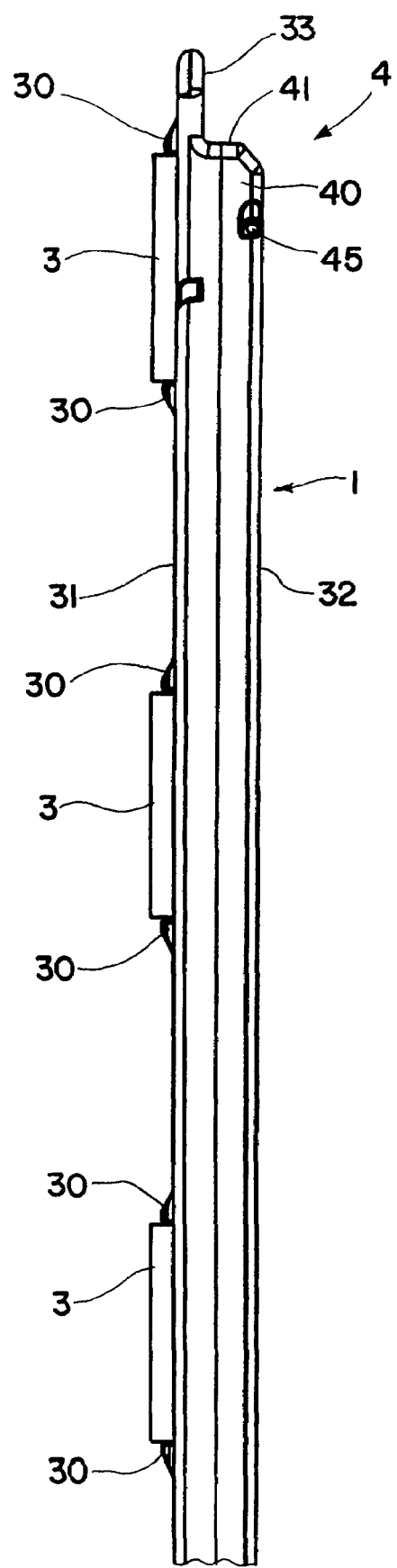
FIG. 2 is a fragmentary side elevation view of the assembly of FIG. 1 as seen from the right hand side thereof.
Figure 7:
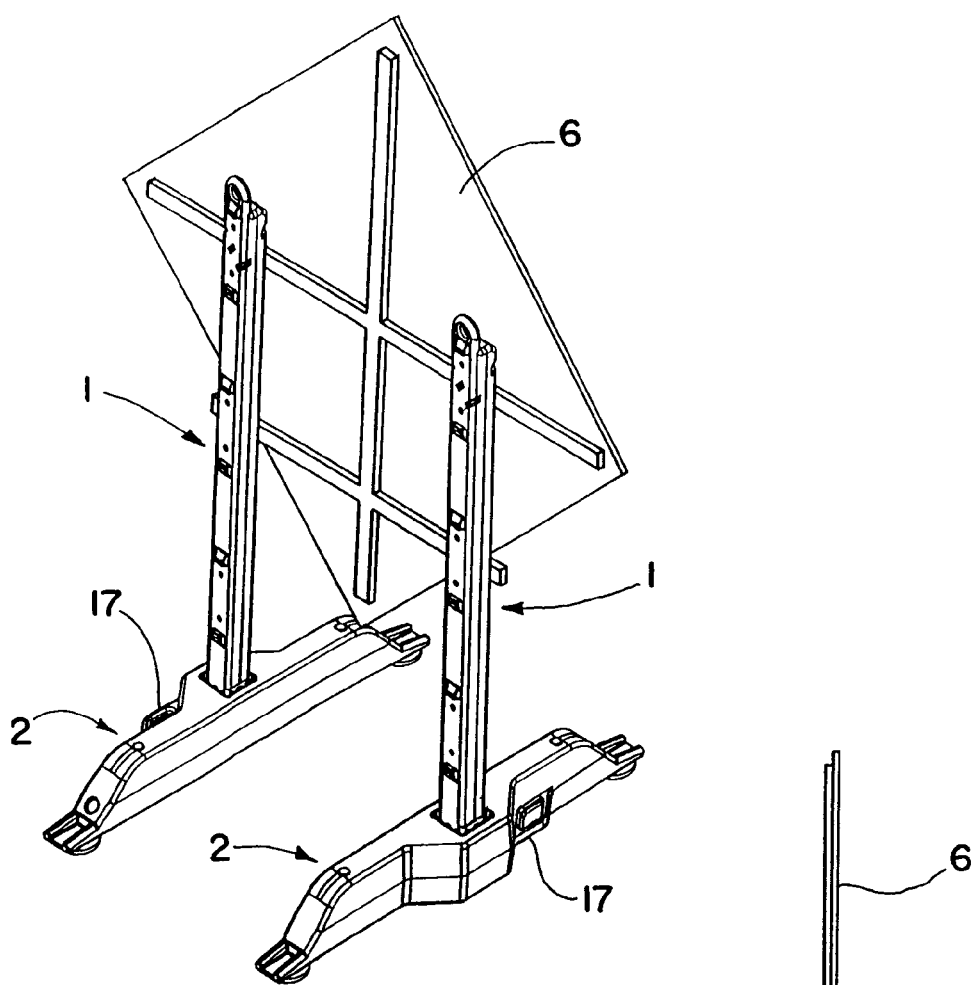
FIG. 7 is a reduced perspective view of the upright and base assembly of FIG. 1 shown being used to support a sign.
Figure 8:
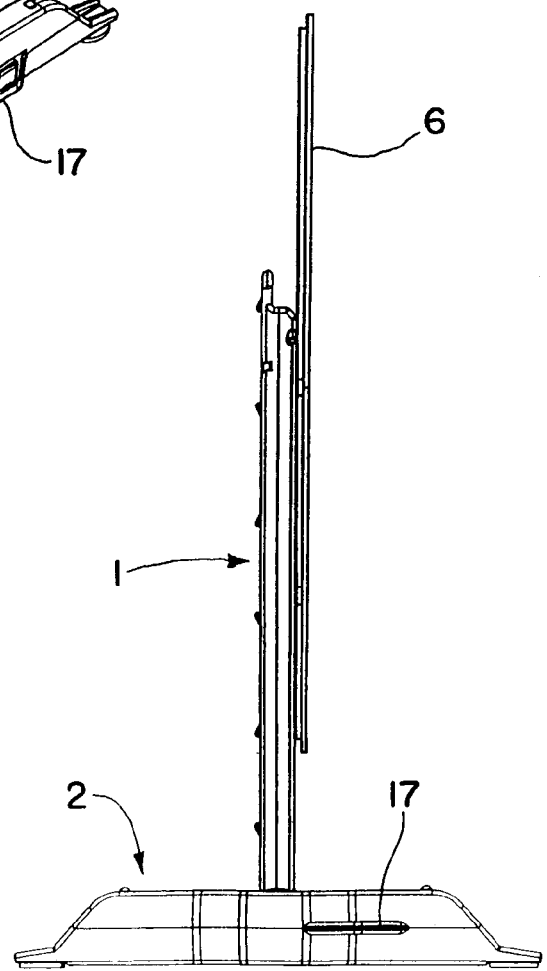
FIG. 8 is a side elevation view of the assembly of FIG. 7 as seen from the right hand side thereof.

Referring now in more detail to the drawings, in which the same reference numbers are used to indicate like parts throughout the several views, and initially to FIGS. 1 and 2, there is shown a pair of uprights 1 of the present invention supported in a generally upright position by a pair of base supports 2 as described hereafter. In FIGS. 1 and 2, three barricade boards 3 are shown attached to the front side of the uprights to provide for example a type III barricade assembly 4 for use on construction sites and the like. However, it should be understood that the uprights 1 may be used for other purposes as well including, for example, to support portable signs 6 or the like as shown in FIGS. 7 and 8.

Figure 3:
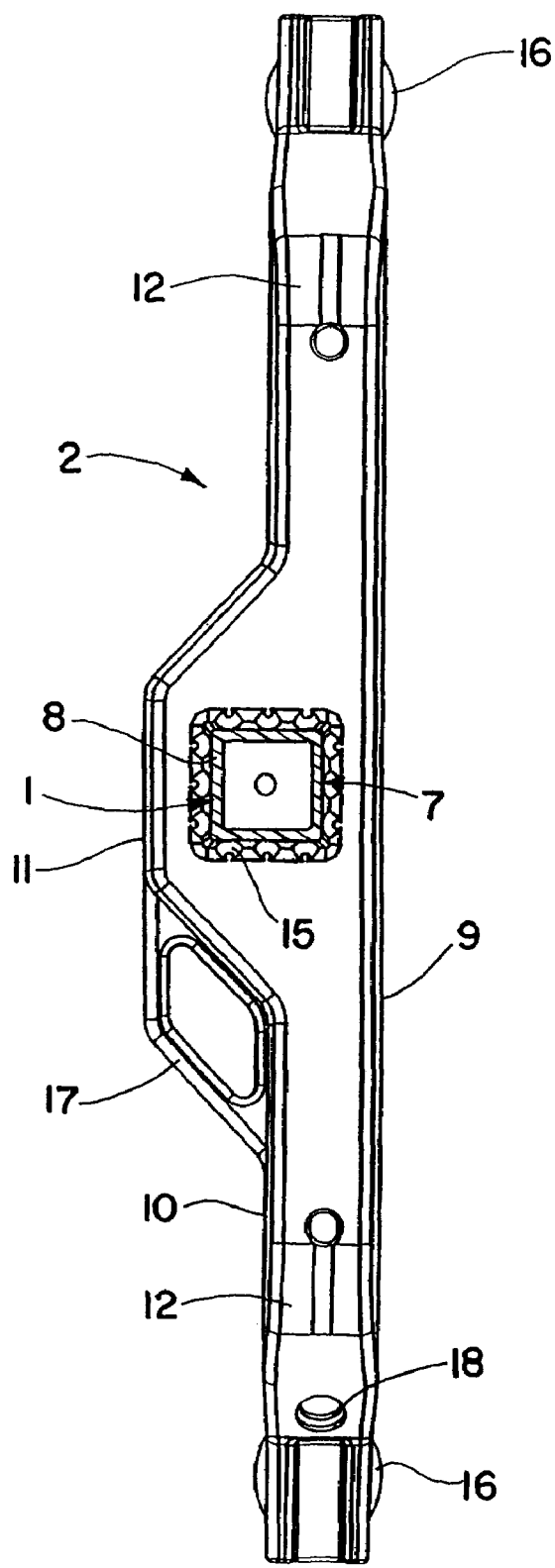
FIG. 3 is an enlarged transverse section through one of the uprights of the assembly of FIG. 1, taken generally along the plane of the line 3-3 thereof.

Each base support 2 may be of any suitable type including the type shown in U.S. patent application Ser. No. 10/737,019, the entire disclosure of which is incorporated herein by reference. As best seen in FIG. 3, each base support includes a non-cylindrical mounting hole 7 extending therethrough intermediate the ends thereof for receiving and supporting a correspondingly shaped non-cylindrical end portion 8 of one of the uprights 1. The base supports 2 may be made relatively lightweight and still have the desired strength and rigidity as by blow molding the base supports out of a suitable plastic material such as high density polyethylene so as to provide relatively thin walled, substantially hollow base supports. To give the base supports added weight during use, they may be filled with a suitable ballast material such as sand or water.

One of the side walls 9 of the base supports may be substantially straight throughout its length to strengthen the base supports against flexing along their length. The opposite side wall 10 may also be substantially straight and parallel to the one side wall except for an intermediate length 11 of the other side wall which may extend laterally outwardly to provide the base supports with a wider intermediate length than end lengths 12 for containing the mounting hole 7 which may be made wider than the width of the end lengths.

A plurality of laterally spaced longitudinally extending ribs 15 may be provided around the entire periphery of the mounting hole 7 that are transversely rounded as shown in FIG. 3 to give the ribs added strength and still allow some flexing of the ribs to permit slightly oversized end portions 8 of the uprights 1 to be inserted into such mounting holes. Also, the radius of the ribs 15 provide line contact with the exterior of the end portions of the uprights to maintain vertical alignment of the uprights in the mounting holes and reduce surface friction between the uprights and ribs for ease of insertion of the uprights into the mounting holes and to allow the uprights to more easily break away from the base supports if a traffic barricade or other device supported by the uprights is impacted by a vehicle, thereby minimizing damage to the vehicle.

Different sized mounting holes 7 may be provided in different base supports 2 that are sized to closely receive different sized end portions of uprights. For example, the mounting holes may be 4"×4" square holes 7 for receiving 4" square end portions of the uprights or 1¾"×1¾" square holes for receiving 1¾" square end portions of standard metal or plastic uprights.

Anti-skid pads 16 may be attached to the bottom walls of the base supports adjacent opposite end portions for increased stability. Also a carrying handle 17 may be provided on the base supports for ease of mobility in carrying multiple base supports. The carrying handle 17 may extend axially from one end portion of the intermediate length 11 of the other side wall 10 toward the end containing the fill hole 18 as shown in FIG. 3 for ease of grasping and standing of the base supports on end during filling of the base supports with fill material.

Preferably the carrying handle does not protrude laterally outwardly beyond the intermediate length 11 of the other side wall 10 and is confined within the total height dimension of the base supports as shown in FIGS. 1 and 2 so the carrying handle is out of the way during use and/or shipment and storage of the base supports.

Figure 11:
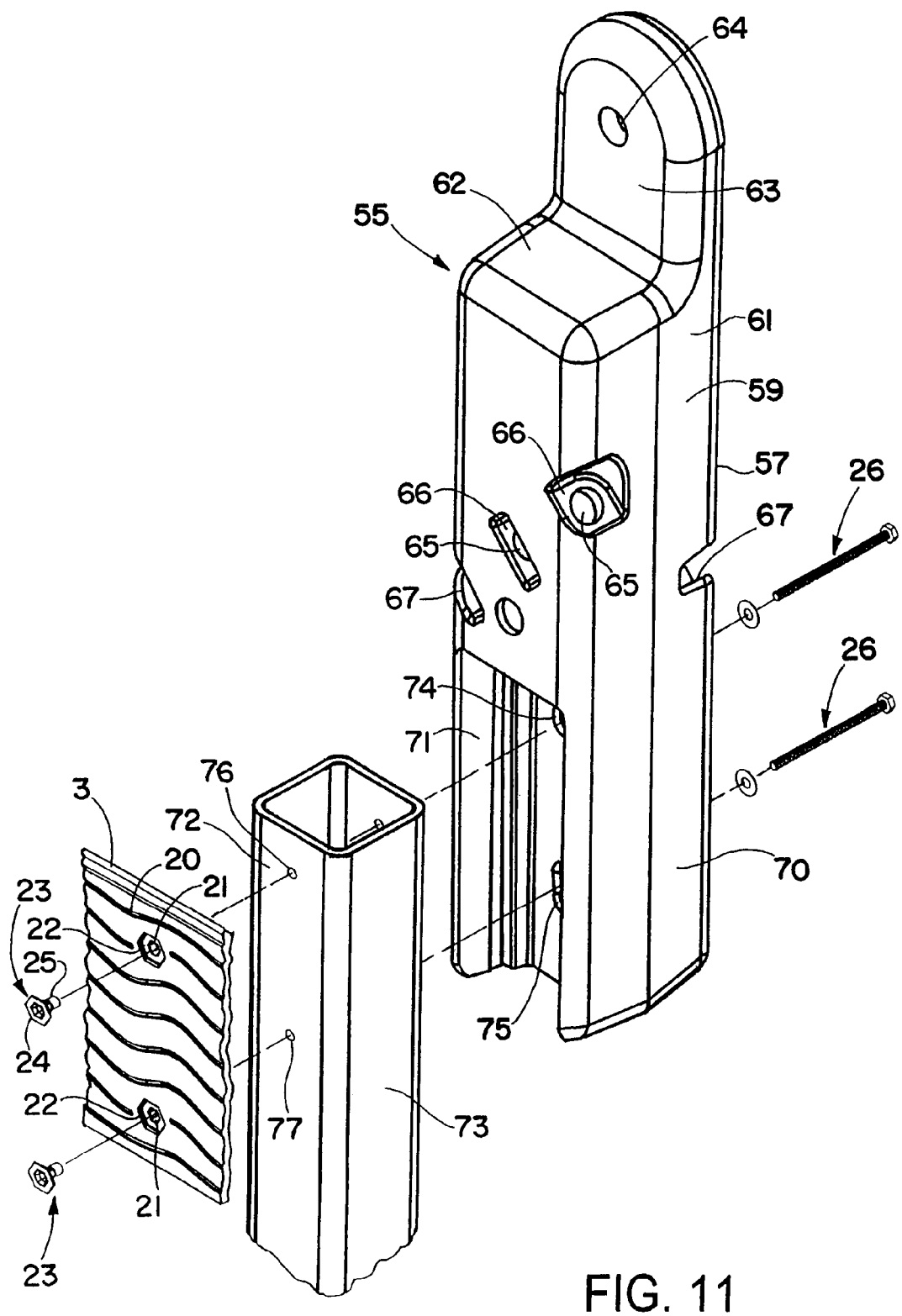
FIG. 11 is an exploded fragmentary perspective view showing the light and flag mount of FIGS. 9 and 10 positioned for attachment to the top of a conventional hollow metal or plastic upright.

The board-like members 3 may be conventional plastic extruded boards provided with reinforced cores for added strength. However, preferably the boards are blow molded to provide relatively high strength reinforced cores that permit the wall thickness of the boards to be made less than conventional extruded boards and still have substantially the same relative strength and stiffness as disclosed in U.S. patent application Ser. No. 11/031,408, the entire disclosure of which is incorporated herein by reference. As disclosed in greater detail in that application, the cores may be formed by molding a plurality of longitudinally extending, laterally spaced aligned channels or grooves 20 in oppositely facing sides of the boards and joining the inner end walls of the aligned channels/grooves together during the blow molding process. Also the channels or grooves 20 may be wavy along their length as shown in FIGS. 1 and 11 for increased strength, and may be spaced from the side edges of the boards and terminate short of the ends of the boards to provide an uninterrupted surface area around the entire periphery of the sides to aid in adhering reflective sheeting (not shown) to one or both sides of the boards. In applications where reflective sheeting may be applied to the boards, the channels 20 may be as narrow as practicable, for example, approximately ⅛" wide, to increase the surface area of the sides of the boards to provide greater support for the reflective sheeting.

Figure 2A:
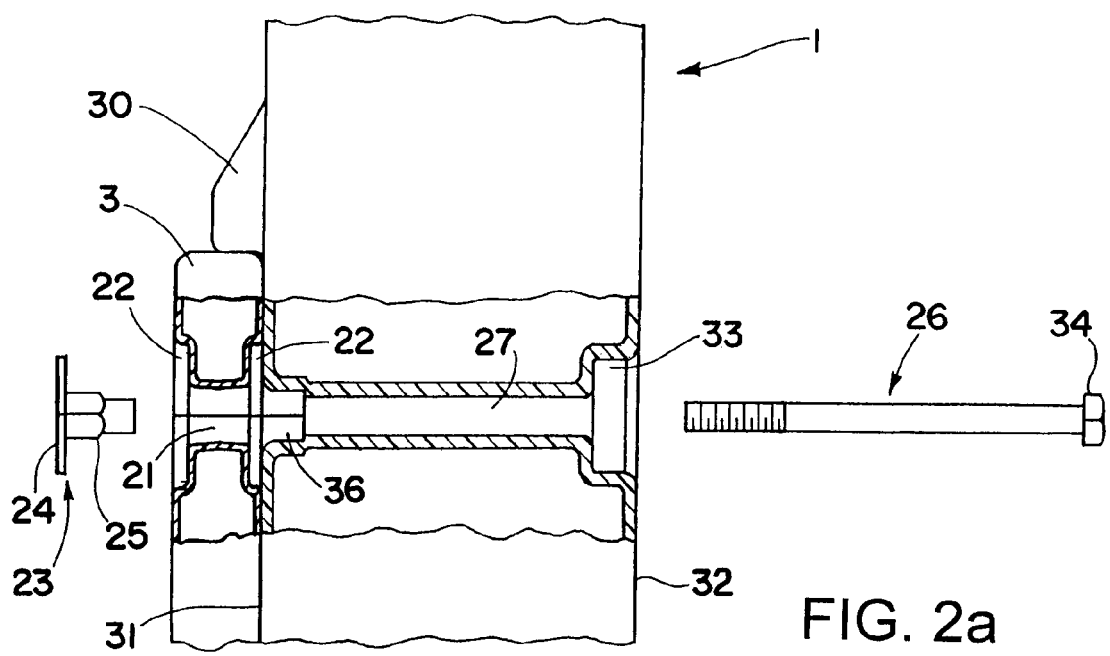
FIG. 2a is an enlarged fragmentary side elevation view of a portion of the upright and one of the barricade boards of FIG. 2, showing one of the mounting holes in one of the board and associated mounting hole in the upright in section and the associated fastener elements in position prior to insertion into the respective mounting holes for attaching the board to the upright.
Figure 2B:
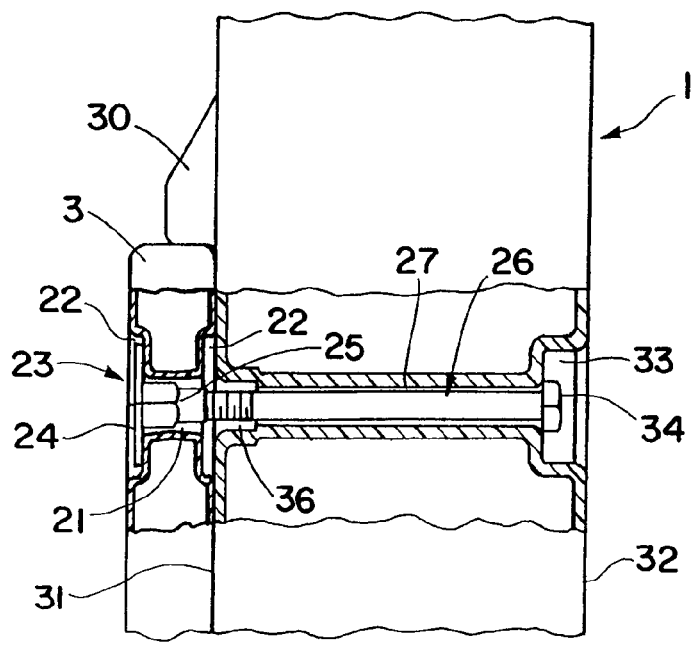
FIG. 2b is an enlarged fragmentary side elevation view similar to FIG. 2a but showing the flush mounting of the fastener nut head in the board mounting hole and the fastener bolt head in the upright mounting hole.

To facilitate mounting of one or more of the members 3 to the uprights 1, mounting holes 21 may be molded completely through the boards 3 from one side to the other as shown in FIG. 11 in areas where the channels 20 are interrupted for added strength and ease of hardware installation. Enlarged recesses 22 may be provided at both ends of the holes 21 for flush mounting of correspondingly shaped fastener heads to protect the sheeting on other boards from being scratched by the fasteners. For example, a pallet nut 23 having a hex head 24 may be received in a correspondingly shaped hex recess 22 in the outer ends of the mounting holes 21 as shown in FIGS. 2a and 2b. Also the recesses 22 may be a little oversized relative to the pallet nut heads 24 to accommodate the sheeting when the hollow, internally threaded shafts 25 of the pallet nuts are pushed through the sheeting and the pallet nut heads are received in the recesses. Then long bolts 26 may be inserted through holes 27 in the uprights 1 and threaded into the internally threaded shafts of the pallet nuts. The non-circular shape of the recesses 22 in the ends of the mounting holes 21 in the boards 3 will prevent the pallet nuts 23 from spinning during tightening of the bolts.

The uprights 1 of the present invention (which are shown in greater detail in FIGS. 4-6) may be made relatively light-weight and still have the desired strength and rigidity as by blow molding the uprights out of a suitable plastic material such as high density polyethylene so that they are hollow with relatively thin walls. A plurality of axially spaced apart pairs of flanges 30 may be integrally molded on the front wall 31 of the uprights so as to protrude outwardly therefrom for aiding in locating and supporting the barricade boards 3 between each pair of flanges as shown in FIGS. 1 and 2. Also the mounting holes 27 may be molded completely through the uprights between each pair of flanges for added strength and ease of installation of one or more long bolts 26 for attaching the barricade boards to the uprights.

The end of the upright mounting holes 27 adjacent the back wall 32 of the uprights may have an enlarged cylindrical recess 33 for receipt of the bolt heads 34 during tightening of the bolts into the pallet nuts from the back using a socket wrench or the like after the pallet nuts have been inserted into the non-cylindrical recesses 22 in the board mounting holes 21. This eliminates the need for having to grip or hold the pallet nuts in place or keep them from turning during tightening of the bolts into the pallet nuts.

Attaching the boards to the uprights in this manner has the advantage that neither end of the fasteners 23, 26 will extend out beyond the board members or uprights. Thus there is no risk of the ends of the fasteners hitting the windshield of a vehicle and poking a hole through it in the event that the assembly is impacted by the vehicle.

The back wall 32 of the uprights 1 may be substantially planar to enable a sign 6 or other structure to be attached to the uprights flush up against the back wall as schematically shown in FIGS. 7 and 8 as by inserting long bolts similar to the bolts 26 through one or more of the upright mounting holes 27 in the opposite direction and threading a nut onto the outer ends of the bolts. In that event, the end of the upright mounting holes 27 adjacent the front wall 31 of the uprights may have a non-cylindrical shaped recess 36 for flush mounting of the bolt head 34 in the recess during tightening of the nut.

Figures 4, 5:
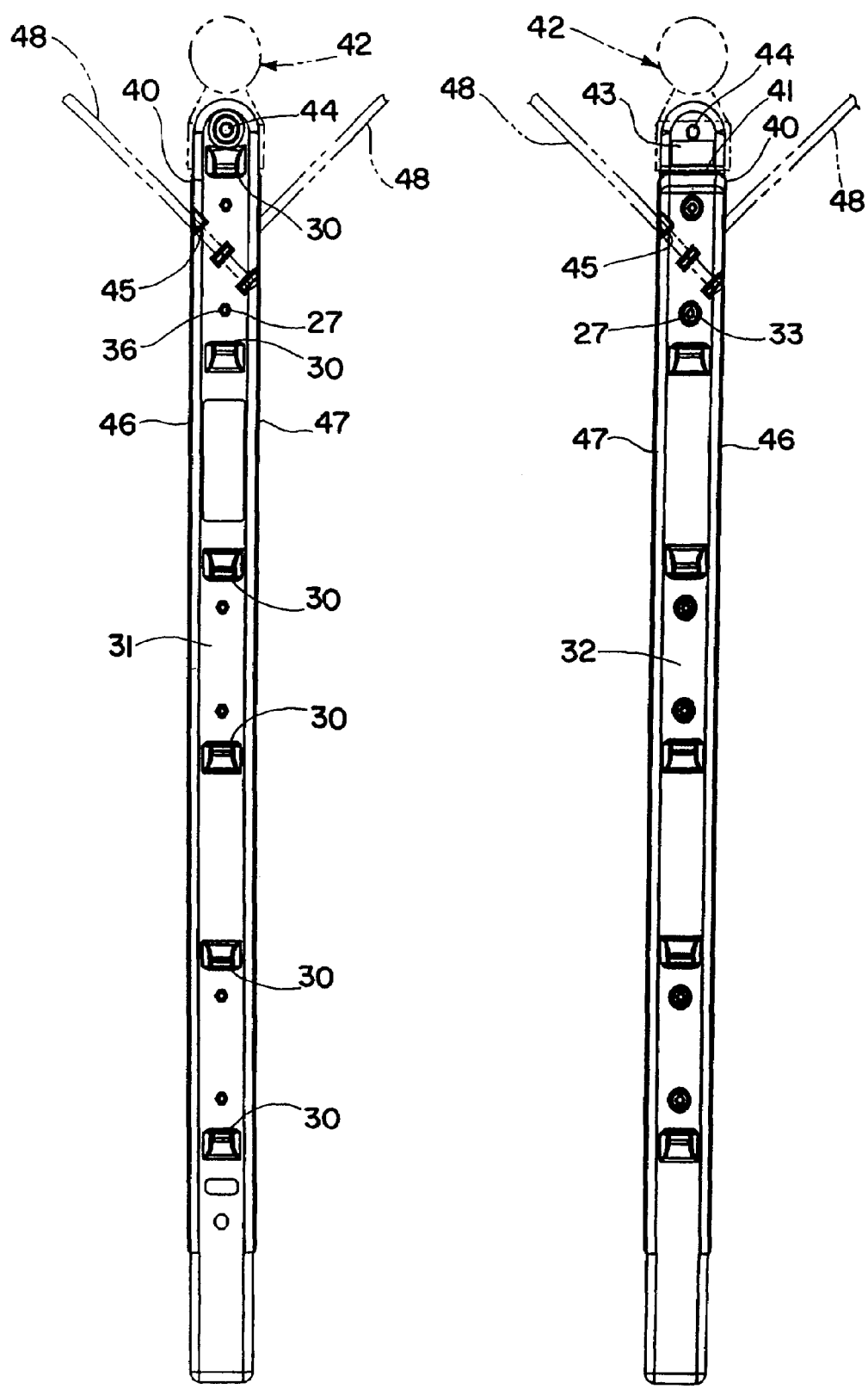
FIG. 4 is an enlarged front elevation view of one of the uprights of FIG. 1.
FIG. 5 is a rear elevation view of the upright of FIG. 4.
Figure 6:
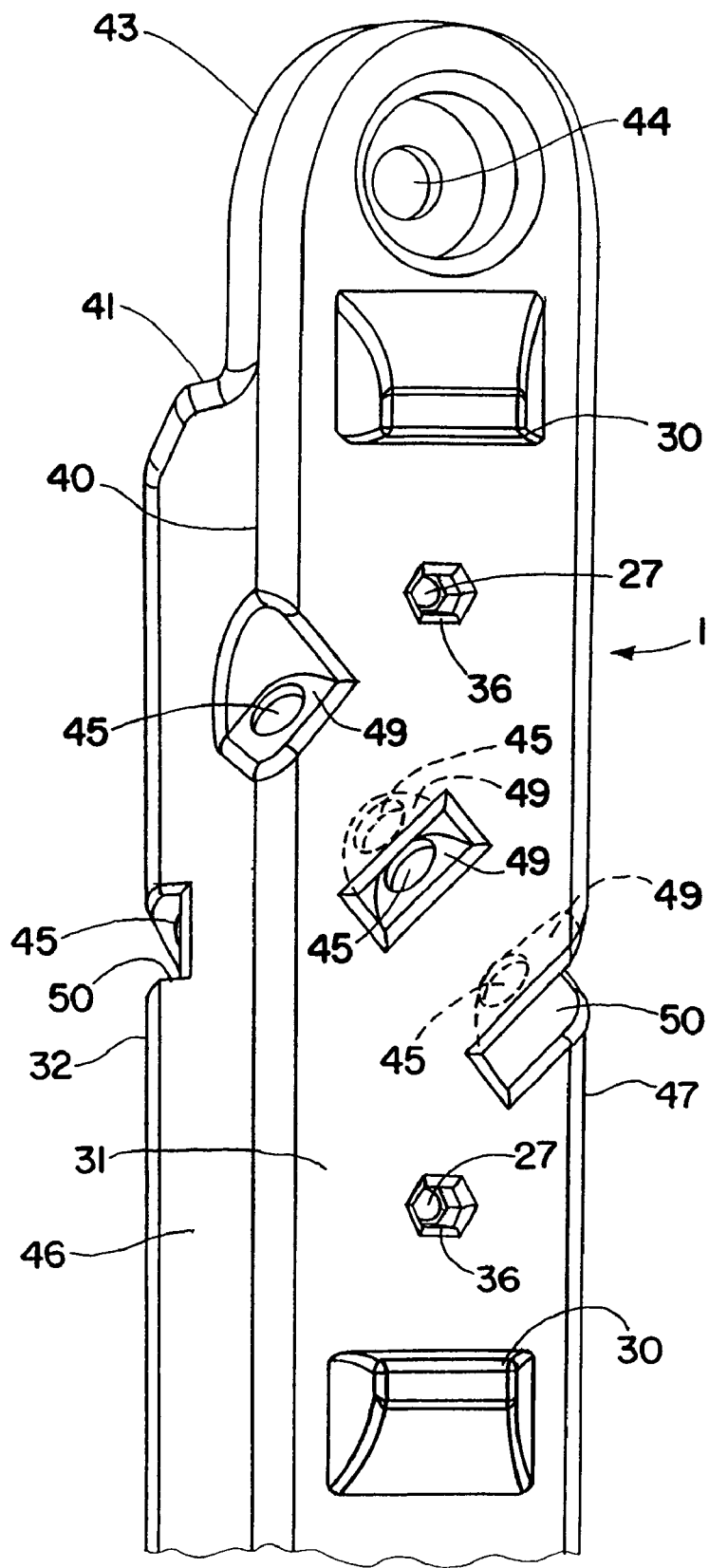
FIG. 6 is an enlarged fragmentary perspective view of the upper end of the upright as seen in FIG. 4.

The upper end 40 of the uprights may be stepped to provide a transversely extending support surface 41 for supporting a light 42 thereon (shown in phantom lines in FIGS. 4 and 5) and an axially outwardly extending surface 43 having a hole 44 extending therethrough as shown in FIGS. 4-6 for receipt of a suitable fastener for attaching the light to the stepped upper end. Further, laterally spaced apart flag mounting holes 45 may extend in opposite directions partway through the uprights at oppositely downwardly extending angles between the side walls 46, 47 of the uprights for receipt of oppositely angled flag poles 48 (shown in phantom lines in FIGS. 4 and 5) immediately below the stepped upper end 40. The respective flag mounting holes 45 may extend through a plurality of axially spaced apart integral molded walls 49 extending laterally inwardly from the respective front and back walls 31, 32 of the uprights as best seen in FIG. 6. Also an integral molded stop surface 50 may extend laterally inwardly from the respective front and back walls 31, 32 in line with the lowermost ends of the respective flag mounting holes as further shown in FIG. 6.

Figure 9:
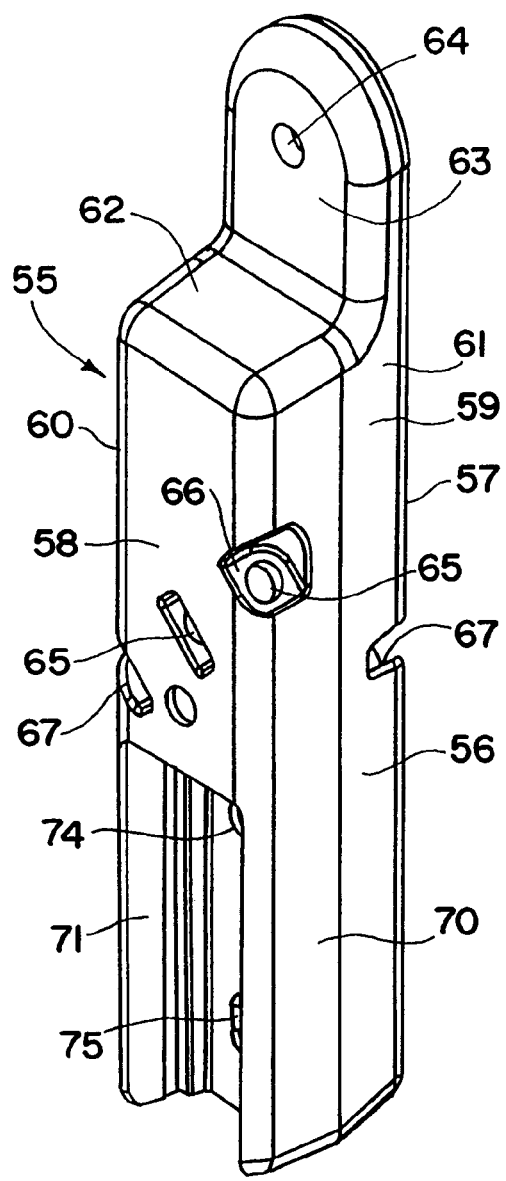
FIG. 9 is a perspective view of one form of light and flag mount of the present invention as seen from one side thereof.
Figure 10:
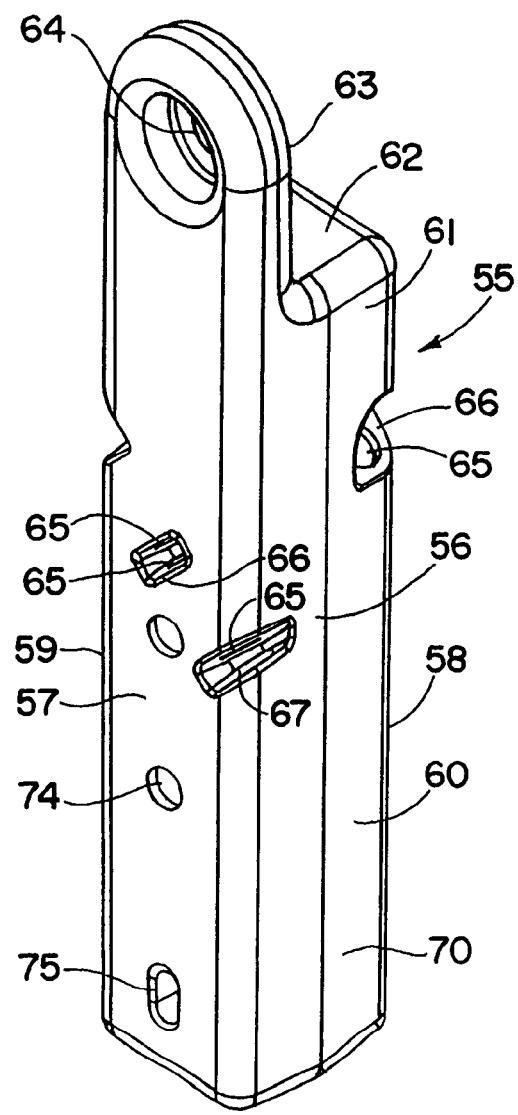
FIG. 10 is a perspective view of the light and flag mount of FIG. 9 as seen from the opposite side thereof.

If standard square hollow metal or plastic tubing is used for the uprights instead of the uprights 1 of the present invention, a combination light and flag mount of the present invention may be attached to the upper end of the uprights. One such combination light and flag mount 55 is shown in FIGS. 9-11, and may comprise a hollow plastic molded body member 56 having front and back walls 57 and 58 and opposite side walls 59 and 60. The upper end 61 of the body member 56 may be stepped to include a transversely extending surface 62 for supporting a light thereon (not shown) and an axially outwardly extending surface 63 having a hole 64 extending therethrough for receipt of a fastener for fastening the light to the stepped upper end, similar to the stepped upper end 40 of upright 1. Also laterally spaced apart flag mounting holes 65 may extend in opposite directions through a plurality of axially spaced integral molded walls 66 in the body member 56 at oppositely downwardly extending angles between the side walls 59, 60 adjacent the stepped upper end for receipt of oppositely angled flag poles, similar to the flag mounting holes adjacent the upper end of uprights 1. Integral molded stop surfaces 67 may extend laterally inwardly from the respective front and back walls 57, 58 in line with the lowermost ends of the flag mounting holes.

Depending on the dimensions of the standard uprights, the lower end portion 70 of the combination light and flag mounts 55 may be dimensioned to be telescopically received within the upper end of the uprights or include a slot 71 in one of the front and back walls dimensioned for receipt of the upper end of the uprights. For example, if the uprights have 4"×4" square upper end portions, the lower end portion 70 of the combination light and flag mounts 55 may be sized to fit within the upper ends of the uprights. If, on the other hand, the uprights are 1¾"×1¾" standard square hollow uprights, the upper end 72 of the uprights 73 may fit into the slot 71 in the front or back wall of the mounts as schematically illustrated in FIG. 11. In either case, suitably axially spaced apart hardware holes 74 and 75 (one of which may be elongated as shown to accommodate possible variations in the spacing between the mounting holes 76 and 77 in the uprights) may be molded completely through the body member into the slots 71 so that the same fasteners 23, 26 that are used to fasten the barricade boards 3 (or other structures) to the uprights may also be used to fasten the combination light and flag mounts 55 to the uprights as further schematically shown in FIG. 11.

Although the invention has been shown and described with respect to certain embodiments, it is obvious that equivalent alterations and modifications will occur to others skilled in the art upon the reading and understanding of the specification. In particular, with regard to various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein exemplary embodiments of the invention. In addition, while a particular feature of the invention may have been disclosed with respect to only one embodiment, such feature may be combined with one or more other features of other embodiments as may be desired and advantageous for any given or particular application.

What is claimed is:

1. In combination, an upright and a base support for supporting said upright in a generally upright position, said upright having a non-cylindrical shaped lower end portion, and said base support having a correspondingly shaped non-cylindrical mounting hole for close sliding receipt of said lower end portion of said upright in said mounting hole, said mounting hole having multiple sides, each of said sides having a plurality of laterally spaced, longitudinally extending ribs around the entire periphery of said mounting hole that are transversely rounded in a direction normal to an axial length of the ribs for establishing axial line contact with said lower end portion of said upright when inserted into said mounting hole, and a combination light and flag mount having a lower end attachable to an upper end of said upright, said combination light and flag mount comprising a hollow molded plastic body member having front and back walls and opposite side walls, and an inwardly stepped upper end having a transversely inwardly extending surface for supporting a light thereon and an axially outwardly extending surface having a hole extending therethrough for receipt of a fastener for attaching the light to said stepped upper end, and at least one flag mounting hole extending at least partway through said body member at a downwardly extending angle between said side walls below said stepped upper end of said body member.

2. The combination of claim 1 wherein there are two laterally spaced apart flag mounting holes extending in opposite directions partway through said body member at oppositely downwardly extending angles between said side walls below said stepped upper end of said body member.

3. The combination of claim 1 wherein said upright has a non-cylindrical shaped opening in said upper end, and said lower end of said body member has a correspondingly non-cylindrical shape sized to be telescopically received in said non-cylindrical shaped opening in said upper end of said upright.

4. The combination of claim 1 wherein said lower end of said body member has an axially extending U-shaped slot in one of said front and back walls, and said upper end of said upright has a corresponding shape for close receipt of said upper end of said upright in said slot in said body member, and one or more fastener mounting holes extend through the other of said front and back walls of said body member into said slot that align with one or more other fastener mounting holes in said upper end of said upright when said upper end of said upright is fitted in said slot.

5. In combination, an upright and a base support for supporting said upright in a generally upright position, said upright having a non-cylindrical shaped lower end portion, and said base support having a correspondingly shaped non-cylindrical mounting hole for close sliding receipt of said lower end portion of said upright in said mounting hole, and a combination light and flag mount having a lower end attachable to an upper end of said upright, said combination light and flag mount comprising a hollow molded plastic body member having front and back walls and opposite side walls, and an inwardly stepped upper end having a transversely inwardly extending surface for supporting a light thereon and an axially outwardly extending surface having a hole extending therethrough for receipt of a fastener for attaching the light to said stepped upper end, and at least one flag mounting hole extending at least partway through said body member at a downwardly extending angle between said side walls below said stepped upper end of said body member.

6. The combination of claim 5 wherein there are two laterally spaced apart flag mounting holes extending in opposite directions partway through said body member at oppositely downwardly extending angles between said side walls below said stepped upper end of said body member.

7. The combination of claim 5 wherein said upright has a non-cylindrical shaped opening in said upper end, and said lower end of said body member has a correspondingly non-cylindrical shape sized to be telescopically received in said non-cylindrical shaped opening in said upper end of said upright.

8. The combination of claim 5 wherein said lower end of said body member has an axially extending U-shaped slot in one of said front and back walls, and said upper end of said upright has a corresponding shape for close receipt of said upper end of said upright in said slot in said body member, and one or more fastener mounting holes extend through the other of said front and back walls of said body member into said slot that align with one or more other fastener mounting holes in said upper end of said upright when said upper end of said upright is fitted in said slot.

* * * * *